United States Patent
Weiss

(10) Patent No.: US 8,271,050 B2
(45) Date of Patent: Sep. 18, 2012

(54) AUTOMATIC IN-VEHICLE MOBILE DEVICE DETECTION

(75) Inventor: Kenneth P. Weiss, Newton, MA (US)

(73) Assignee: Universal Secure Registry, LLC, Newton, MA (US)

( * ) Notice: Subject to any disclaimer, the term of this patent is extended or adjusted under 35 U.S.C. 154(b) by 212 days.

(21) Appl. No.: 12/122,137

(22) Filed: May 16, 2008

(65) Prior Publication Data

US 2008/0287064 A1    Nov. 20, 2008

Related U.S. Application Data

(60) Provisional application No. 60/938,915, filed on May 18, 2007, provisional application No. 60/939,191, filed on May 21, 2007.

(51) Int. Cl.
*H04M 1/00* (2006.01)
(52) U.S. Cl. .................... 455/569.2; 455/41.2
(58) Field of Classification Search .............. 455/41.2, 455/41.3, 507, 557, 569.1, 569.2, 99, 344, 455/345, 10.1, 552.1, 553.1
See application file for complete search history.

(56) References Cited

U.S. PATENT DOCUMENTS

| | | | | |
|---|---|---|---|---|
| 7,266,204 | B2 * | 9/2007 | Watson et al. | 381/86 |
| 7,515,943 | B2 * | 4/2009 | Wada | 455/569.1 |
| 7,702,324 | B2 * | 4/2010 | Suzuki et al. | 455/420 |
| 2001/0021640 | A1 * | 9/2001 | Lappe | 455/41 |
| 2005/0136958 | A1 * | 6/2005 | Seshadri et al. | 455/519 |
| 2005/0221805 | A1 * | 10/2005 | Koyano | 455/414.2 |

* cited by examiner

*Primary Examiner* — Ping Hsieh
(74) *Attorney, Agent, or Firm* — Lando & Anastasi, LLP

(57) ABSTRACT

A system and method for automatically configuring a communications system between a local mode in which a local communications device (such as an in-vehicle device or "land-line phone") is active and a remote mode in which a mobile communications device is active and coupled to the communications system. One example of the method includes searching for a Bluetooth™ enabled device, selecting the remote mode of operation responsive to detection of the Bluetooth™ enabled device, and selecting the local mode of operation responsive to failure to detect the Bluetooth™ enabled device. In one example, selecting the local mode of operation includes activating the local communications device, and selecting the remote mode of operation includes activating local Bluetooth™ systems to connect the Bluetooth™ enabled device to the communications system.

20 Claims, 3 Drawing Sheets

AUTOMATIC IN-VEHICLE MOBILE DEVICE DETECTION

CROSS REFERENCE TO RELATED APPLICATIONS

This application claims priority under 35 U.S.C. §119(e) to U.S. Provisional Patent Application No. 60/938,915 entitled "Automatic In-Vehicle Mobile Device Detection" filed May 18, 2007, and to U.S. Provisional Patent Application No. 60/939,191 entitled "Automatic In-Vehicle Mobile Device Detection" filed May 21, 2007, both of which are herein incorporated by reference in their entireties.

BACKGROUND

1. Field of Invention

At least one embodiment is directed to a system and methods for automatically detecting and enabling mobile telephone capability within a given location, such as a vehicle, and typically within an automobile.

2. Discussion of Related Art

Recent years have seen a proliferation of portable electronic devices such as mobile (cellular) telephones. This proliferation has also led to an increase in the number of people using cellular telephones while driving in cars.

Many luxury cars are now available with built-in and hands-free communication capability. For example, some cars come equipped with a built-in car phone that includes an external antenna mounted on the vehicle. Others may have integrated handsfree sets that allow a user to connect their mobile phone to the car's systems, such as the car's external antenna and/or audio systems and in some applications independent integrated transceiver circuitry.

Bluetooth™ wireless technology facilitates mobile communication in vehicles. Bluetooth™ is a manufacturer-independent standard for the wireless connection of electronic devices over short distances. Bluetooth™ enhances the comfort, convenience, and safety, of automotive communications by enabling wireless connections between a mobile phone and other devices in the vehicle. Bluetooth™ functionality depends on which Bluetooth™ profiles the devices support: The Bluetooth™ Handsfree Profile enables handsfree communication through a wireless connection between mobile phone and the car phone or devices. The Bluetooth™ SIM Access Profile on the other hand offers the additional possibility of using certain car phones to access the contact and ID data stored on the SIM card of the user's mobile phone. In the mobile phone, the mobile communication is de-activated, meaning the GSM or CDMA functionality of a mobile phone is in a quasi off mode: the mobile phone merely "lends" the car phone the information stored on its SIM card.

The Bluetooth™ SIM access allows a user to enjoy the benefits of a car phone with external GSM antenna (such as improved reception and audio quality), and handsfree mode, while maintaining the GSM identity (i.e., the phone number and SIM card) of the user's mobile phone. Via the Bluetooth™ SIM Access Profile, the car system can access the SIM card of a compatible mobile phone and log onto the GSM network. As soon as the user gets out of the car or presses a certain button on his mobile phone, the receiving mode is deactivated, and the mobile phone automatically logs back onto its mobile network.

SUMMARY OF INVENTION

Aspects and embodiments of the invention are directed to a system and method for automatically connecting a user's mobile communications device (such as a mobile phone or PDA) to a local communications system, such as an integrated "in-vehicle" communications system or home/office "land-line" telephone service, and for automatically selecting an operating mode of the local communications system based on availability of the mobile communications device.

One embodiment is directed to a method of automatic mode selection for a vehicular communications system, the method comprising searching for a Bluetooth™ enabled device, selecting a remote mode of operation responsive to detection of the Bluetooth™ enabled device, and selecting a local mode of operation responsive to failure to detect the Bluetooth™ enabled device, wherein selecting the local mode of operation includes activating an in-vehicle communications device, and wherein selecting the remote mode of operation includes activating in-vehicle Bluetooth™ systems to connect the Bluetooth™ enabled device to the vehicle communications system.

In one example, the method further comprises activating the vehicular communications system prior to searching for the Bluetooth™ enabled device. Searching for the Bluetooth™ enabled device may include searching for a registered Bluetooth™ enabled device, the registered Bluetooth™ enabled device being registered with the vehicular communications system. In one example, selecting the local mode of operation includes activating the in-vehicle communications device responsive to failure to detect the registered Bluetooth™ enabled device. The method may further comprise detecting a plurality of Bluetooth™ enabled devices, selecting one or more of the plurality of Bluetooth™ enabled devices, and connecting the selected one of the plurality of Bluetooth™ enabled devices to the vehicular communications system. In one example, detecting the plurality of Bluetooth™ enabled devices includes detecting a registered Bluetooth™ enabled device, and selecting one or more of the plurality of Bluetooth™ enabled devices includes selecting the registered Bluetooth™ enabled device.

Another embodiment is directed to a method of automatically configuring a vehicular communications system between a local mode in which an in-vehicle communications device is active and a remote mode in which a mobile communications device is active and coupled to the vehicular communications system, the method comprising. In this embodiment, the method comprises searching for the mobile communications device, activating the remote mode responsive to successful detection of the mobile communications device, and activating the local mode responsive to failure to detect the mobile communications device. In one example, searching for the mobile communications device includes searching for a registered mobile communications device. Accordingly, activating the remote mode may includes activating the remote mode responsive to successful detection of the registered mobile communications device, and activating the local mode may include activating the local mode responsive to failure to detect the registered mobile communications device. In another example, the method further comprises detecting a plurality of mobile communications devices, and selecting one or more of the plurality of mobile communications devices to be coupled to the vehicular communications system. Detecting the plurality of mobile communications devices may include detecting at least one registered mobile communications device, and selecting one or more of the plurality of mobile communications devices may include selecting at least one registered mobile communications device. In another example, searching for the mobile communications device includes searching for a Bluetooth™ enabled mobile communications device, such as, for example, a Bluetooth™ enabled mobile phone. In one example, activating the remote mode includes coupling the Bluetooth™ enabled mobile communications device to an in-vehicle transceiver via a Bluetooth™ interface.

Methods according to various aspects and embodiments may be implemented by software. For example, a computer-readable medium may be provided having computer-readable signals stored thereon that define instructions that, as a result of being executed by a processor, instruct the processor to implement an example of the method(s) described herein, or variations thereof.

According to another embodiment, a communications system configurable between a local mode and a remote mode comprises a local infrastructure, a local communications device coupled to the local infrastructure, a Bluetooth™ interface coupled to the local infrastructure and configured to communication with a Bluetooth™ enabled device, and a controller coupled to the local infrastructure and the Bluetooth™ interface and configured to activate the remote mode responsive to detection of the Bluetooth™ enabled device and to activate the local mode responsive to failure to detect the Bluetooth™ enabled device, wherein in the remote mode, the Bluetooth™ enabled device is coupled to the local infrastructure via the Bluetooth™ interface. The local infrastructure may comprise, for example, a telephone handset and/or telephone base unit for a "land-line" telephone system or an in-vehicle communications system including, for example, an integrated transceiver and antenna.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Various aspects of at least one embodiment are discussed below with reference to the accompanying figures. In the figures, which are not intended to be drawn to scale, each identical or nearly identical component that is illustrated in various figures is represented by a like numeral. For purposes of clarity, not every component may be labeled in every drawing. The figures are provided for the purposes of illustration and explanation and are not intended as a definition of the limits of the invention. In the figures.

DETAILED DESCRIPTION

Figure 1:
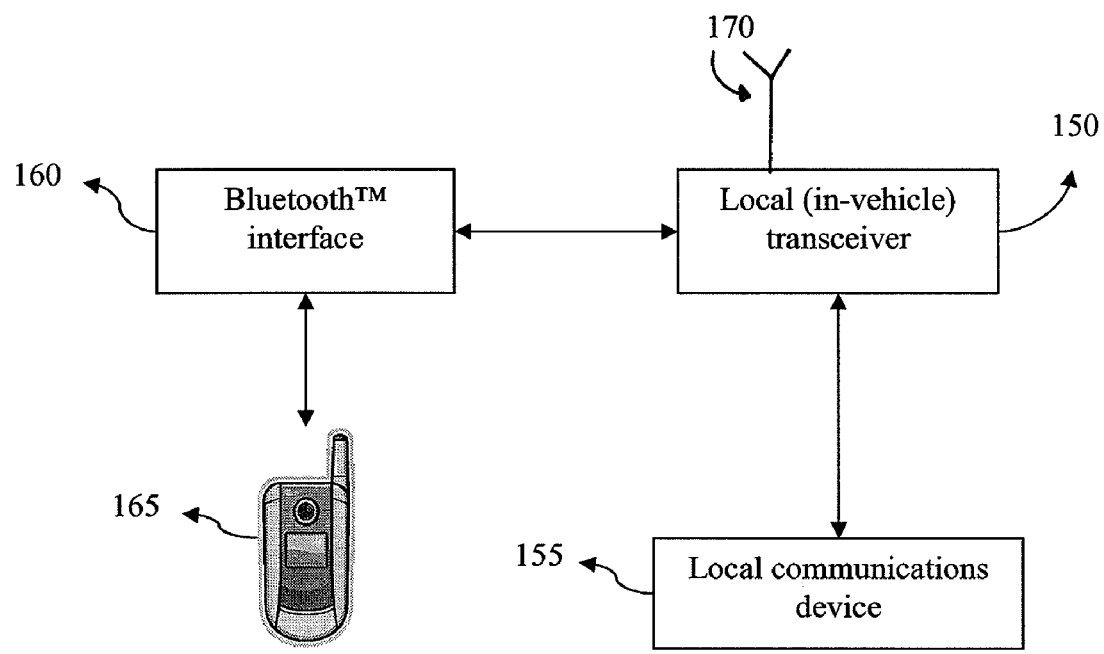
FIG. 1 is a block diagram of one example of at least a portion of a communications system according to aspects of the invention.

Aspects and embodiments are directed to a system and methods for automatically connecting a user's mobile phone to local communications system. Using the Bluetooth™ protocol, or a similar short-range communications protocol, the system may be configured to automatically search for an available compatible mobile device (such as a cellular phone or PDA) and connect a detected device to the local communications system. The term "local communications system" as used herein is intended to refer to a communications system within a designated location such as a vehicle, home or office. For example, a vehicular local communications system, also referred to as an in-vehicle communications system, may include a transceiver, antenna and interface components integrated within a vehicle such as an automobile or boat. A home or office-based local communications system may include, for example, a "land-line" telephone system including a handset and/or base unit. Therefore, although the following discussion may refer primarily to in-vehicle communications systems, it is to be appreciated that the invention is not so limited and may be used with any local communications system.

As discussed further below, according to one embodiment, where the local communications system includes a local communications device, such as a "car phone" for in-vehicle communications systems, or a "land-line" phone for in-home or office-based communications systems, the system may automatically pick between activating the local communications device or a detected mobile device, based on various criteria, such as availability of a compatible mobile device, reception for the mobile device, user preferences, etc., as discussed below. Systems and methods according to various aspects and embodiments may provide the convenience of automatic mobile communications connectivity in a local environment, such as a vehicle, home or office, without requiring substantial user intervention, as discussed further below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. For example, it is to be appreciated that although embodiments of the system may be discussed below with reference to the GSM communications standard, the invention is not so limited and the embodiments of the system and methods may be used with communications devices operating according to any communication standard. Examples of specific implementations are provided herein for illustrative purposes only and are not intended to be limiting. In particular, acts, elements and features discussed in connection with any one or more embodiments are not intended to be excluded from a similar role in any other embodiments. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

As discussed above, many luxury cars offer users the ability to use dedicated car phone systems with the user's own mobile phone and internal SIM card. Some cars may provide both a local car phone (i.e., the phone circuitry permanently installed in the car) as well as connectivity to the user's mobile phone. For example, one car manufacturer provides a SIM card reader in the car, for example, in the armrest, where the user can simply insert a SIM card to use the car phone system. This SIM card may in one example be the SIM card from the user's mobile phone or independent SIM card dedicated to the car. The car phone system uses a built-in antenna and car cell transceiver circuitry in the car such that reception may be improved significantly over a typical mobile phone reception.

In some cars, the car phone is provided in conjunction with a Bluetooth™ integrated system that allows the user to connect their mobile phone to the car phone system, as discussed above. The car phone may have a different telephone number than does the mobile phone and, in some examples, may use different communications standards or protocols (e.g., GSM rather than CDMA), thus offering the user the advantage of multiple different phone options.

In these cars, the car's communication system may be capable of operating with either the car phone or the user's connected Bluetooth™ enabled mobile phone. For example, referring to FIG. 1, the car's communication system include an in-vehicle transceiver 150 that is communicates with both an in-vehicle communications device 155 and a Bluetooth™ interface 160. The transceiver is coupled to the vehicle's built in antenna 170, as discussed above. The in-vehicle communications device 155 may include the car phone or a SIM card reader, as discussed above. The Bluetooth™ interface 160 communicates with Bluetooth™ enabled devices, such as a Bluetooth™ enabled mobile phone 165. Thus, the system may have two switchable modes, namely "local mode" in which the system uses the local (car) phone (with its number and protocol), and "remote mode" in which the system is "locked" to the user's mobile phone. Similarly, in the context of a home- or office-based local communication system, in the local mode, the system may use the "land-line" phone. When the system is in remote mode, the system connects the user's mobile phone to the in-vehicle transceiver 150 using the Bluetooth™ interface 160. Similarly, in a home or office environment, in remote mode, the system may connect the user's mobile phone to the "land-line" phone systems, allowing the user to use the mobile phone number, features and functionality through the "land-line" infrastructure.

Conventionally in vehicular systems, the user selects the communication system mode via a user interface, such as a menu on an LCD display integrated in the car. To change between modes, the user accesses the user interface and, for example, scrolls through menus and options to select which mode of operation (local or remote mode). This has the disadvantage that user action is required to switch between communication system modes, eliminating the convenience of simply getting into the car and having the Bluetooth™ handshake automatically capture the registered cell phone.

Figure 2:
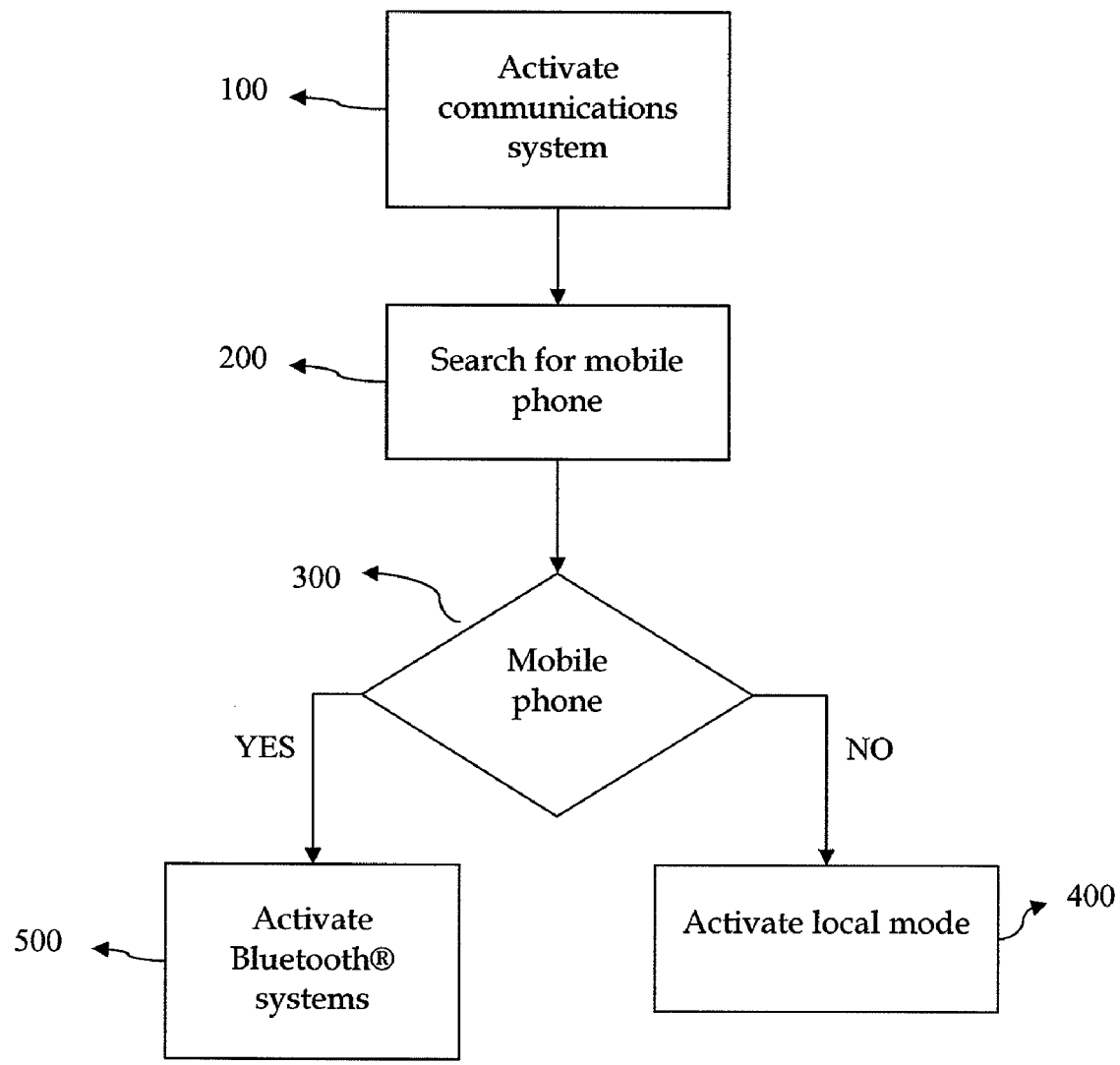
FIG. 2 is a flow diagram of one example of a method of automatic mode selection for a communications device, according to aspects of the invention.

According to one embodiment, software may be provided that allows the system to automatically change between remote mode and local mode depending on the detection via Bluetooth™ of the availability of the user's registered mobile phone. Referring to FIG. 2, there is illustrated a flow diagram of one example of a method of automatic mode selection. In a first step 100, the communication system may be activated, for example, when the ignition key is turned, or the car is otherwise turned on (for example, by using a keyless remote). Once activated, the system may automatically "seek" for the user's mobile phone (step 200). In particular, step 200 may include searching for a Bluetooth™ enabled phone which can be automatically coupled to the in-vehicle systems via the Bluetooth™ interface 160. One embodiment of the system may be configured to automatically select between local mode and remote mode based on whether an available Bluetooth™ enabled phone is found (decision block 300) during step 200. In one example, a certain time period may be set during which the system looks for a Bluetooth™ phone. If no available Bluetooth™ enabled phone is detected during the pre-defined seek time period, the system may stop searching and default to the local mode (step 400). If the local car phone has a SIM card slot, the system may prompt the user to supply a SIM card, or may automatically activate the local phone if there is an already provided SIM card. Alternatively, if a Bluetooth™ enabled phone is located, the system may switch to remote mode (step 500) and activate any necessary systems to couple the detected Bluetooth™ enabled phone to the in-vehicle transceiver 150.

Similarly, in the context of a home- or office-based local communications system that includes a "land-line" phone, the "land-line" phone handset or base station may include a Bluetooth™ interface and/or SIM card slot that allows one or more mobile phones to be coupled to the local communications system. As discussed above with reference to the in-vehicle scenario, the system may search for a compatible mobile phone and automatically couple a detected compatible phone to the local systems or, in the event no such mobile phone is found, default to the local mode.

Figure 3:
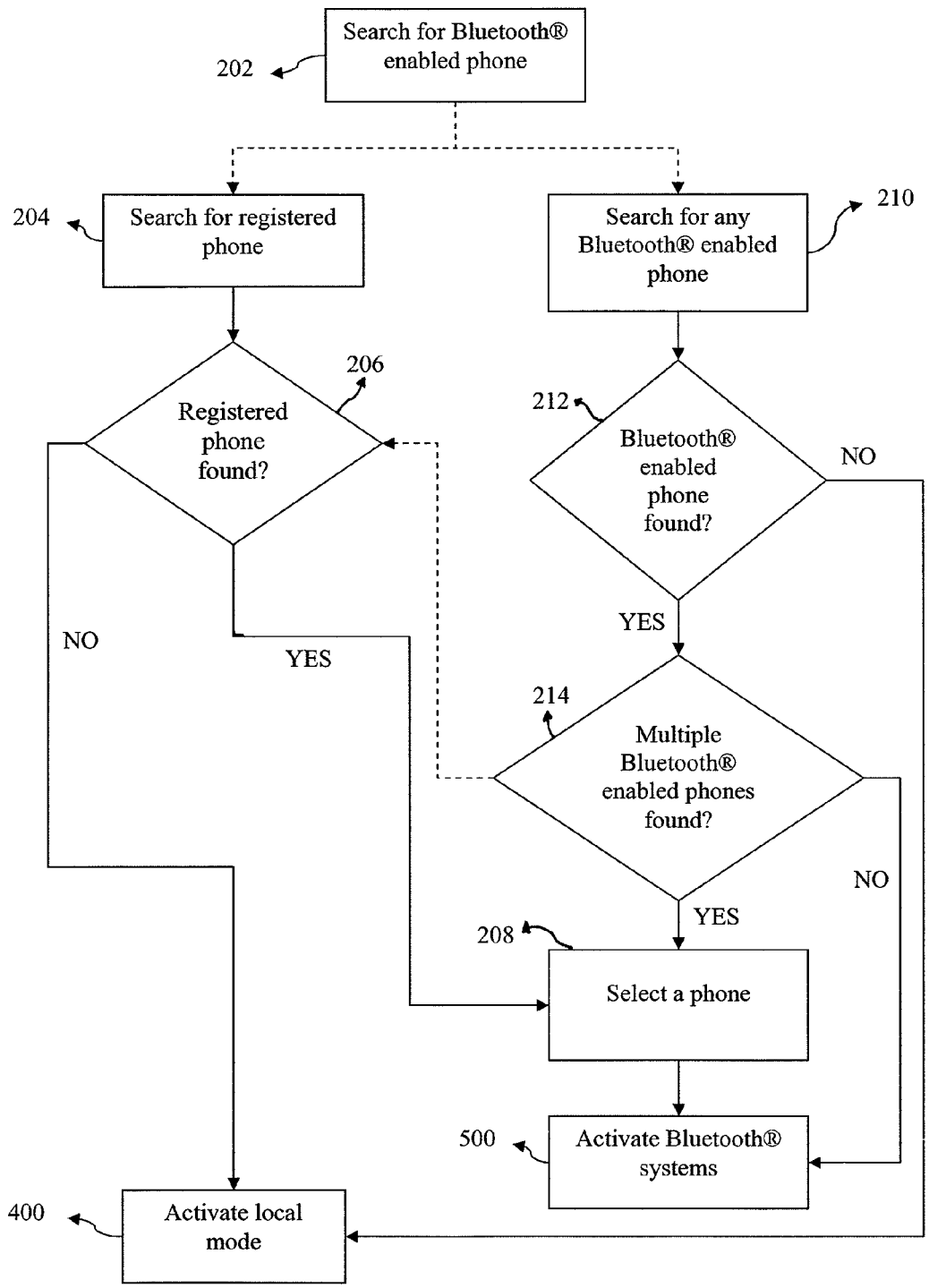
FIG. 3 is a flow diagram of one example of a method of selecting an operating mode according to aspects of the invention.

Referring to FIG. 3, there is illustrated a flow diagram of one example of a method of searching for a mobile phone (step 200 in FIG. 2) and selecting a communications mode. As discussed above, searching for a mobile phone generally includes searching for a Bluetooth™ enabled phone (step 202). However, it is to be appreciated that the invention is not limited to the use of the Bluetooth™ protocol, and any similar protocol (known or later-developed) may be used instead. In one example, the user may "register" a particular mobile phone (or a plurality of phones) with the car, such that the system looks for that particular mobile phone or phones (step 204). If a registered phone is found (decision block 206), the system may select that registered phone (step 208) and activate the Bluetooth™ systems to operate in remote mode (step 500), as discussed above. If no registered phone is found (decision block 206), the system may switch to local mode (step 400), as discussed above.

Alternatively, in a step 210, the system may look for any Bluetooth™ enabled phone (so long as the phone is supported by the system). As discussed above, if no Bluetooth™ enabled phone is found (decision block 212), the system may default to or switch to local mode (step 400). If multiple Bluetooth™ enabled phones are detected (block 214), the system may select one of the detected phones to connect to the in-vehicle systems (step 208). In one example, the system may request that the user select one or more of the detected phones via the user interface. In another example, the system may be configured to automatically select which phone (or phones) to connect based on proximity or a rule set up by the user. For example, if the system detects both a registered phone and a non-registered phone, the system may default to the registered phone. If a Bluetooth™ enabled phone is available, and has been selected, the system may activate the integrated Bluetooth™ systems (step 500) to connect the phone to the car systems (such as the antenna 170 and/or audio and transceiver systems 150).

It is to be appreciated that there are several circumstances in which the system may conclude that there is no available Bluetooth™ phone. For example, the user may not have brought their mobile phone into the car, or the battery of the user's mobile phone may be discharged, or the Bluetooth™ feature may be shut off, or the driver may not be aware that the vehicle may have been previously switched from remote SIM to local SIM mode. Alternatively, the car may be in an area where the user's mobile phone does not have reception, for example, because the car is not within the coverage area of the mobile phone's network. These possible conditions dramatically defeat the convenience and safety features which were intended with Bluetooth™ connectivity. In any of these or other circumstances, the system can be configured to automatically default to the local mode. Similarly, there are several circumstances under which the system may have found and selected a Bluetooth™ enabled phone, and be operating in remote mode, but subsequently connection to the Bluetooth™ enabled phone may be lost. For example, the battery on the phone may run down (if the phone is not plugged in), or the vehicle may enter an area where there is little or no mobile phone reception. In these and similar circumstances, the system may automatically switch to local mode. The system may then either remain in local mode until some action is taken by the user, or may automatically periodically seek for a Bluetooth™ enabled phone (for example, using the method shown in FIG. 3, or a variation thereof), and switch back to remote mode if a suitable phone is found.

Thus, the car may always be online and reachable without user involvement either through the mobile remote mode or the local mode. In another embodiment the vehicle software is configured to monitor both the local SIM (phone number) and the remote cell phone SIM (phone number) such that an incoming call from either device may be automatically available to the driver. Similarly, in the context of a home- or office-based system, the software may be configured to monitor both the local "land-line" number and the mobile phone number such that the user may receive, on the land-line handset, a call directed to either the local number or the land-line number.

Having thus described several aspects of at least one embodiment, it is to be appreciated various alterations, modifications, and improvements will readily occur to those skilled in the art. For example, it is to be appreciated that, if desired, the user may override the automatic detection and selection process discussed herein, and manually select the local mode or a particular mobile phone to use in the mobile mode. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of automatic mode selection for a vehicular communications system, the method comprising:
    searching for a Bluetooth™ enabled cellular communications device;
    selecting a remote mode of operation responsive to detection of the Bluetooth™ enabled cellular communications device; and
    selecting a local mode of operation responsive to failure to detect the Bluetooth™ enabled cellular communications device;
    wherein selecting the local mode of operation includes activating an in-vehicle cellular communications device for cellular communications;
    wherein selecting the remote mode of operation includes activating in-vehicle Bluetooth™ systems to connect the Bluetooth™ enabled cellular communications device to the vehicle communications system to provide for cellular communications with a combination of the Bluetooth™ enabled cellular communications device and the vehicle communications system; and
    automatically selecting between activating one of the local mode of operation to provide for cellular communications and the remote mode of operation to provide for cellular communications based on the detection of the Bluetooth™ enabled cellular communications device and based on reception of a mobile phone network by the Bluetooth™ enabled cellular communications device.

2. The method as claimed in claim 1, further comprising:
    activating the vehicular communications system prior to searching for the Bluetooth™ enabled device.

3. The method as claimed in claim 1, wherein searching for the Bluetooth™ enabled device includes searching for a registered Bluetooth™ enabled device, the registered Bluetooth™ enabled device being registered with the vehicular communications system.

4. The method as claimed in claim 3, wherein selecting the local mode of operation includes activating the in-vehicle communications device responsive to failure to detect the registered Bluetooth™ enabled device.

5. The method as claimed in claim 1, further comprising:
    detecting a plurality of Bluetooth™ enabled devices;
    selecting one of the plurality of Bluetooth™ enabled devices; and
    connecting the selected one of the plurality of Bluetooth™ enabled devices to the vehicular communications system.

6. The method as claimed in claim 5, wherein detecting the plurality of Bluetooth™ enabled devices includes detecting a registered Bluetooth™ enabled device; and
    wherein selecting one of the plurality of Bluetooth™ enabled devices includes selecting the registered Bluetooth™ enabled device.

7. The method of claim 5, comprising:
    requesting that a user select the one of the plurality of Bluetooth enabled devices via a user interface.

8. A method of automatically configuring a vehicular communications system between a local mode in which an in-vehicle cellular communications device is active and a remote mode in which a mobile cellular communications device is active and coupled to the vehicular communications system, the method comprising:
    searching for the mobile cellular communications device;
    activating the remote mode responsive to successful detection of the mobile cellular communications device;
    activating the local mode responsive to failure to detect the mobile cellular communications device; and
    automatically selecting between activating one of the in-vehicle cellular communications device in the local mode to provide for cellular communications and the mobile cellular communications device in the remote mode to provide for cellular communications based on the detection of the mobile cellular communications device and based on reception of a mobile phone network by the Bluetooth™ enabled cellular communications device.

9. The method as claimed in claim 8, wherein searching for the mobile communications device includes searching for a registered mobile communications device.

10. The method as claimed in claim 9, wherein activating the remote mode includes activating the remote mode responsive to successful detection of the registered mobile communications device; and
    wherein activating the local mode includes activating the local mode responsive to failure to detect the registered mobile communications device.

11. The method as claimed in claim 8, further comprising:
    detecting a plurality of mobile communications devices; and
    selecting one of the plurality of mobile communications devices to be coupled to the vehicular communications system.

12. The method as claimed in claim 11, wherein detecting a plurality of mobile communications devices includes detecting a registered mobile communications device; and
wherein selecting one of the plurality of mobile communications devices includes selecting the registered mobile communications device.

13. The method as claimed in claim 8, wherein searching for the mobile communications device includes searching for a Bluetooth™ enabled mobile communications device.

14. The method as claimed in claim 13, wherein searching for the Bluetooth™ enabled mobile communications device includes searching for a Bluetooth™ enabled mobile phone.

15. The method as claimed in claim 13, wherein activating the remote mode includes coupling the Bluetooth™ enabled mobile communications device to an in-vehicle transceiver via a Bluetooth™ interface.

16. A communications system configurable between a local mode and a remote mode, the system comprising:
a local infrastructure;
a local communications device coupled to the local infrastructure;
a Bluetooth™ interface coupled to the local infrastructure and configured to communication with a Bluetooth™ enabled cellular communications device; and
a controller coupled to the local infrastructure and the Bluetooth™ interface and configured to automatically activate one of the remote mode to provide for cellular communications and the local mode to provide for cellular communications responsive to detection of the Bluetooth™ enabled cellular communications device and based on reception of a mobile phone network by the Bluetooth™ enabled cellular communications device;
wherein in the remote mode, the Bluetooth™ enabled cellular communications device is coupled to the local infrastructure via the Bluetooth™ interface.

17. The communications system as claimed in claim 16, wherein the local infrastructure comprises at least one of a telephone handset and a telephone base unit.

18. The communications system as claimed in claim 16, wherein the local infrastructure comprises a transceiver integrated within a vehicle.

19. The communications system as claimed in claim 16, wherein the controller is configured to activate the local mode responsive to failure to detect the Bluetooth™ enabled device.

20. A non-transitory computer readable medium having stored thereon sequences of instructions, the sequences of instructions including instructions that, when executed by a processor, cause the processor to:
search for a mobile cellular communications device;
activate a remote mode for cellular communications in which the mobile communications device is active and coupled to a vehicular communications system responsive to successful detection of the mobile cellular communications device;
activate a local mode for cellular communications in which an in-vehicle cellular communications device is active responsive to failure to detect the mobile cellular communications device; and
select between activating one of the in-vehicle cellular communications device in the local mode to provide for cellular communications and the mobile communications device in the remote mode to provide for cellular communications based on detection of the mobile communications cellular device and based on reception of a mobile phone network by the Bluetooth™ enabled cellular communications device.

* * * * *